United States Patent
Sellers et al.

(10) Patent No.: US 10,257,583 B2
(45) Date of Patent: Apr. 9, 2019

(54) METHOD FOR DELIVERING AND PRESENTING TARGETED ADVERTISEMENTS WITHOUT THE NEED FOR TIME SYNCHRONIZED CONTENT STREAMS

(71) Applicant: ARRIS Enterprises LLC, Suwanee, GA (US)

(72) Inventors: Scott D. Sellers, Quakertown, PA (US); Albert F. Elcock, West Chester, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/436,306

(22) Filed: Feb. 17, 2017

(65) Prior Publication Data

US 2017/0238068 A1    Aug. 17, 2017

Related U.S. Application Data

(60) Provisional application No. 62/296,225, filed on Feb. 17, 2016.

(51) Int. Cl.

| H04N 7/10 | (2006.01) |
|---|---|
| H04N 21/81 | (2011.01) |
| H04N 21/234 | (2011.01) |
| H04N 21/43 | (2011.01) |
| H04N 21/6405 | (2011.01) |

(Continued)

(52) U.S. Cl.
CPC ..... *H04N 21/812* (2013.01); *H04N 21/23424* (2013.01); *H04N 21/4302* (2013.01);
(Continued)

(58) Field of Classification Search
CPC ......... H04N 21/4307; H04N 21/44016; H04N 21/4622; H04N 21/8547
See application file for complete search history.

(56) References Cited

U.S. PATENT DOCUMENTS

| 5,859,660 A | * | 1/1999 | Perkins | ............ | H04N 21/23424 |
|---|---|---|---|---|---|
| | | | | | 348/584 |
| 6,195,368 B1 | * | 2/2001 | Gratacap | .......... | H04N 21/23424 |
| | | | | | 370/412 |

(Continued)

FOREIGN PATENT DOCUMENTS

| EP | 2876890 A1 | 5/2015 |
|---|---|---|
| WO | 2015/188100 A1 | 12/2015 |

OTHER PUBLICATIONS

PCT Search Report & Written Opinion, Re: Application No. PCT/US2017/018453, dated Apr. 26, 2017.

*Primary Examiner* — Pankaj Kumar
*Assistant Examiner* — Timothy R Newlin
(74) *Attorney, Agent, or Firm* — Thomas A. Ward

(57) ABSTRACT

A method is provided for delivering targeted advertisements into a QAM or IP stream that provides accurate synchronization. The method includes synchronizing the internal content of a IP stream delivering video with an advertisement (ad) stream by providing content information in the IP stream and the network stream, the content information including positional information and/or referential information, wherein the positional information is inserted at key locations identified with a PTS value, and wherein the referential information refers to a position in the IP stream or the ad stream, the referential information including either a PTS value or a frame count.

2 Claims, 4 Drawing Sheets

(51) Int. Cl.
  *H04N 21/643* (2011.01)
  *H04N 21/835* (2011.01)
  *H04N 21/433* (2011.01)
  *H04N 21/44* (2011.01)
  *H04N 21/458* (2011.01)
  *H04N 21/6336* (2011.01)
  *H04N 21/845* (2011.01)

(52) U.S. Cl.
  CPC ... *H04N 21/4331* (2013.01); *H04N 21/44016* (2013.01); *H04N 21/458* (2013.01); *H04N 21/6336* (2013.01); *H04N 21/6405* (2013.01); *H04N 21/64322* (2013.01); *H04N 21/835* (2013.01); *H04N 21/8455* (2013.01)

(56) References Cited

U.S. PATENT DOCUMENTS

| | | | |
|---|---|---|---|
| 2002/0087976 A1* | 7/2002 | Kaplan | H04N 7/17336 725/34 |
| 2003/0043847 A1* | 3/2003 | Haddad | G11B 27/005 370/473 |
| 2006/0287915 A1* | 12/2006 | Boulet | G06Q 30/02 705/14.61 |
| 2007/0192789 A1* | 8/2007 | Medford | H04N 21/23476 725/31 |
| 2010/0043022 A1* | 2/2010 | Kaftan | G06Q 30/02 725/34 |
| 2010/0325657 A1* | 12/2010 | Sellers | H04N 21/23424 725/32 |
| 2011/0043524 A1* | 2/2011 | Chen | G06Q 30/02 345/427 |
| 2013/0081078 A1* | 3/2013 | Del Sordo | H04N 21/4331 725/34 |
| 2014/0237536 A1* | 8/2014 | Jang | H04N 21/43 725/131 |
| 2014/0344852 A1* | 11/2014 | Reisner | H04N 21/2668 725/32 |
| 2015/0007218 A1* | 1/2015 | Neumann | H04N 21/23424 725/32 |
| 2016/0100220 A1* | 4/2016 | Toma | H04H 60/13 725/110 |

* cited by examiner

P – special PMT with ApproachingEdge flag and PTS value

A – special PMT with AtEdge flag

D – Position in stream where PTS value in the descriptor is encountered in the decoded video frame

METHOD FOR DELIVERING AND PRESENTING TARGETED ADVERTISEMENTS WITHOUT THE NEED FOR TIME SYNCHRONIZED CONTENT STREAMS

CROSS REFERENCE TO RELATED APPLICATION

This Application claims priority under 35 U.S.C. § 119 (e) from earlier filed U.S. Provisional Application Ser. No. 62/296,225 filed on Feb. 17, 2016 and incorporated herein by reference in its entirety.

BACKGROUND

Technical Field

The present invention relates to providing targeted advertisements in a video data content stream. More particularly, the present invention relates to synchronizing the targeted advertisement with the video content to allow proper insertion of targeted ads.

Related Art

To date, non-Digital Video Recorder (DVR) based targeted advertising has been constrained for use only in Quadrature Amplitude Modulation (QAM) based systems. This is due to the nature of the Targeted Advertising's (TAD) greatest use case constraint, proper timing. Because a QAM systems data stream is extremely time accurate, moving from a data stream to an advertisement stream in a time aligned manner is not very difficult.

Internet Protocol (IP) based video offers no such advantage. In IP streams, the video, audio and associated data can suffer significant time jitter and thus require larger data buffers on the Consumer Premises Equipment (CPE), such as a Set Top Box (STB), to ensure underflow and overflow conditions are minimized.

At present, the number of available Ads which can be offered is severely limited due to bandwidth constraints in QAM based cable plants. The ability to use IP or IP MultiCast (IPMC) for Ad delivery would allow a system operator to target each household with the entirety of the available ad space, not just a bandwidth constrained subset.

For singlecast or unicast IP delivery of video, targeted advertising can be easily implemented through the use of manifest files (HLS, Smooth Streaming, MPEG-DASH . . . ).

In many applications it is desirable to provide a method for delivering targeted delivery of ads using multicast IP delivery of video. In order to accomplish any kind of time synchronized delivery of IP based Audio-Visual (A/V) multicast content, a method of synchronizing the internal content of the streams must be utilized. This synchronization should use a method which is MPEG compliant, does not adversely affect non-TAD devices, and easily augments existing content streams.

SUMMARY

According to embodiments of the present invention, a method is provided for synchronizing video streams with ad streams in multicast streams that provides modified content information. The modified content information is both positional and referential, utilizing a common MPEG compliant methodology. Positional content information is inserted at key locations in the video or ad stream. Referential content information refers to a position in a stream, such as a Presentation Timestamp (PTS) value. Ideally, both position and referential content information are used because positional data is ideal for managing buffers, while referential data is ideal for use by processing components in a STB.

In one embodiment, positional data is provided by insertion of a Program Map Table (PMT) with a special (private) descriptor. The PMT with the special description is added into a stream at specific locations as desired. For non-TAD devices, the extra PMT descriptor is simply ignored.

In one embodiment, the referential data includes PTS data that can be used by a decoder of a STB or other processing elements of the STB. One approach to carrying the desired PTS data in a stream is to insert it into the PMT descriptor used for the positional data. This approach of inserting PTS data into the PMT descriptor eliminates the need for specialized in-band service components, or any Out-Of-Band (OOB) data delivery. This referential PMT is inserted some time ahead of the upcoming presentation time as indicated by the PTS it carries. This provides time for the controller to extract the PTS and ready the system for the upcoming frame containing that PTS value.

Accordingly, in one embodiment of the invention a method is provided for delivering targeted advertisements, the method including: synchronizing the internal content of a multicast IP stream delivering video with an advertisement (ad) stream by providing content information in the network stream and the ad stream, the content information including positional information and/or referential information, wherein the positional information is inserted at key locations identified with a PTS value, and wherein the referential information refers to a position in the IP stream or the ad stream, the referential information including either a PTS value or a frame count. Further in the method, the positional information is provided via insertion of a PMT with a special descriptor into the IP (Ad) stream and the network stream.

In one specific embodiment a method is provided that inserts an IP advertisement into a QAM network. The method includes: determining by a TAD control application that a QAM or IP multicast stream has an upcoming ad interval into which a targeted ad can be placed; determining available ads that are suited for the household receiving this stream; selecting one of the available ads to provide via the ad stream; providing the ad stream to the STB some predetermined time before the ad stream needs to be inserted in to the QAM or IP multicast network stream, wherein the ad stream content begins with a leader which allows the system to perform a PMT acquisition; processing the ad stream to extract PSI data and scan for a PMT with a special TAD descriptor containing an AT EDGE marker; discarding all data in the ad buffer prior to the AT EDGE marker; scanning the QAM or IP multicast network content stream for a PMT with a special TAD descriptor containing an APPROACHING EDGE marker and a specified PTS value, wherein the specified PTS value is the system time of the desired last displayed frame of the network content stream; and providing an indication when a frame with the specified PTS is decoded, and when the decoded frame is displayed then flushing the decoder buffers and reprogramming the decoder to receive the already buffered ad stream; releasing to the decoder the buffered contents of the ad stream beginning with the first packet of an I-frame identified by the PMT AT EDGE marker; followed by processing the inserted ad stream in the decoder.

BRIEF DESCRIPTION OF THE DRAWINGS

Further details of the present invention are explained with the help of the attached drawings in which.

DETAILED DESCRIPTION

Figure 1:
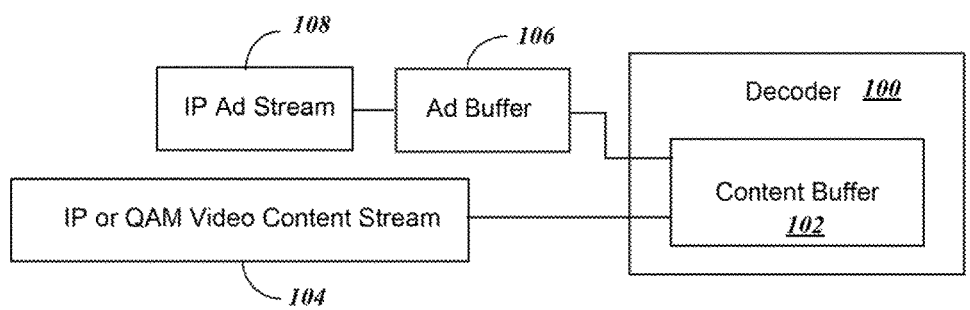
FIG. 1 illustrates insertion of ads into video content in a decoder according to embodiments of the present invention.

FIG. 1 illustrates insertion of ads into video content in a decoder according to embodiments of the present invention. The method delivers targeted ads using IP delivery that can be inserted into QAM video or IP video network content. FIG. 1 shows a decoder 100 with an internal buffer 102 providing video content for processing. The decoder buffer 102 receives QAM or IP streaming video content 104. An Ad buffer 106 provides IP streaming Ad data 108 to the decoder buffer 102. Methods according to embodiments of the present invention enable synchronization of the Ad stream 108 with the video content stream 104 so that targeted Ads can be inserted at a desired location in the video content 104.

In order to accomplish any kind of time synchronized delivery of IP based Audio-Visual (A/V) multicast content, a method of synchronizing the internal content of the streams must be utilized. This synchronization should use a method which is MPEG compliant, does not adversely affect non-TAD devices, and easily augments existing content streams.

Figure 2:
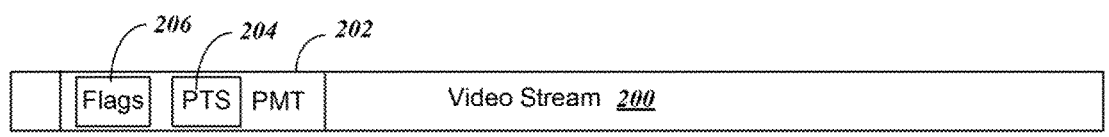
FIG. 2 illustrates how that content information can be provided into a data stream to enable synchronization according to embodiments of the present invention.

FIG. 2 illustrates how that content information can be provided into a data stream 200 to enable synchronization according to embodiments of the present invention. The modified content information can be positional or referential. Positional content information is inserted at key locations in the video or ad stream and in one embodiment is provided by insertion of a Program Map Table (PMT) 202 with a special descriptor. The PMT with the special description is added into a stream at specific locations as desired, and in one embodiment the special descriptor is provided via a Presentation Timestamp (PTS) 204. Referential content information refers to a position in a stream and can be provided in one embodiment as a Presentation Timestamp (PTS) 204 value. Referential content information can alternatively be a frame count. Ideally, both position and referential content information are used because positional data is ideal for managing buffers, while referential data is ideal for use by processing components in a STB.

Figure 3:
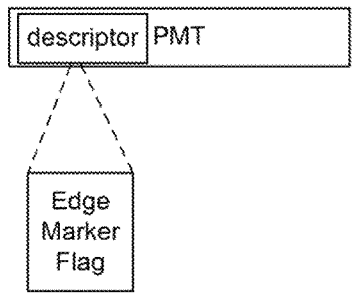
FIG. 3 illustrates that for the Ad stream, the PTS special descriptor for the position content can in one embodiment include an AT EDGE marker (or indicator) to enable alignment.
Figure 4:
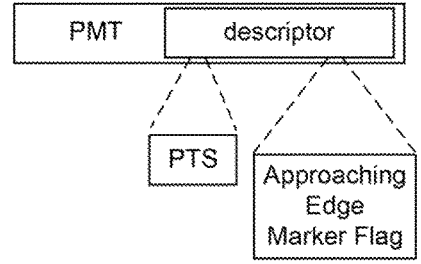
FIG. 4 illustrates that for the video content stream, the special descriptor for the position content can in one embodiment include an APPROACHING EDGE marker that contains a PTS value and is used to enable synchronization.

Both the Ad stream 108 and the video content stream 104 can form the video stream 200 and contain the position PMT 202 with indicator flags 206 as well as the referential position PMT portion with a special descriptor containing a PTS 204. FIG. 3 illustrates that for the Ad stream 108, the PMT special descriptor for the position content can in one embodiment include an AT EDGE MARKER to enable alignment. Further details of how the AT EDGE MARKER is used to align the Ad stream 108 for insertion into the video content stream 104 is described subsequently. FIG. 4 illustrates that for the video content stream 104, the PMT with special descriptor for the position content can in one embodiment include an APPROACHING EDGE MARKER and PTS value that is used to enable synchronization as described subsequently. This approach of inserting PTS data into the PMT descriptor eliminates the need for any special time synchronized data delivery. The AT EDGE marker descriptors in the PTS data can be recognized and used by a STB to appropriately control the decoder.

The PMT can contain multiple descriptors. Embodiments of the present invention introduce a custom (private) descriptor. The descriptor will have two fields one is a flag field and is set to either AT EDGE or APPROACHING EDGE. The second field in the same descriptor is the PTS value, valid when APPROACHING EDGE is indicated.

Figure 5:
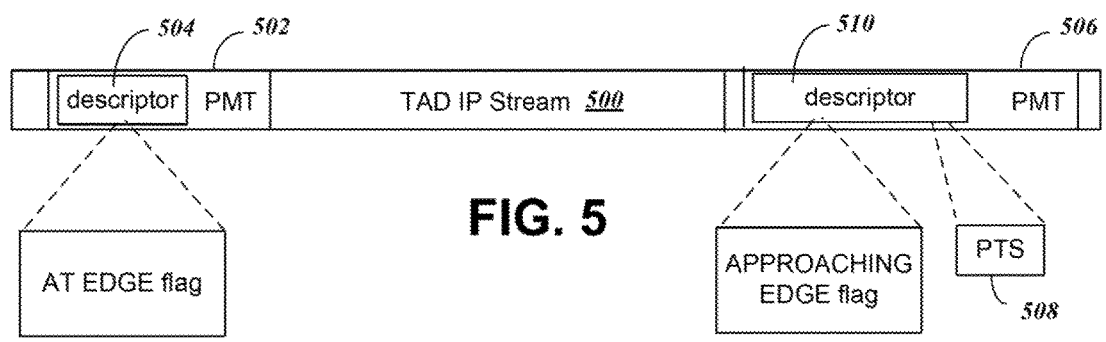
FIG. 5 illustrates example contents of a TAD IP stream.

One example of providing content in an IP Ad stream to enable synchronization is described as follows. In this example, streaming Targeted Advertising (TAD) IP content is modified to contain extra PMTs, each PMT containing an inserted descriptor with a stream state flag and some with a PTS value. FIG. 5 illustrates example contents of the TAD IP stream 500. This TAD stream 500 with modified content is provided to a STB decoder for synchronization and insertion into video content. In the modified content, the first inserted PMT 502 contains a descriptor 504 with an AT EDGE flag so that appropriate processing is started. The next PMT 506 contains a PTS value 508 and descriptor 510 containing the APPROACHING EDGE flag. Once the last frame has been presented, then the system is free to setup the decoder buffers for any upcoming advertising stream or a return to the network stream.

Figure 6:
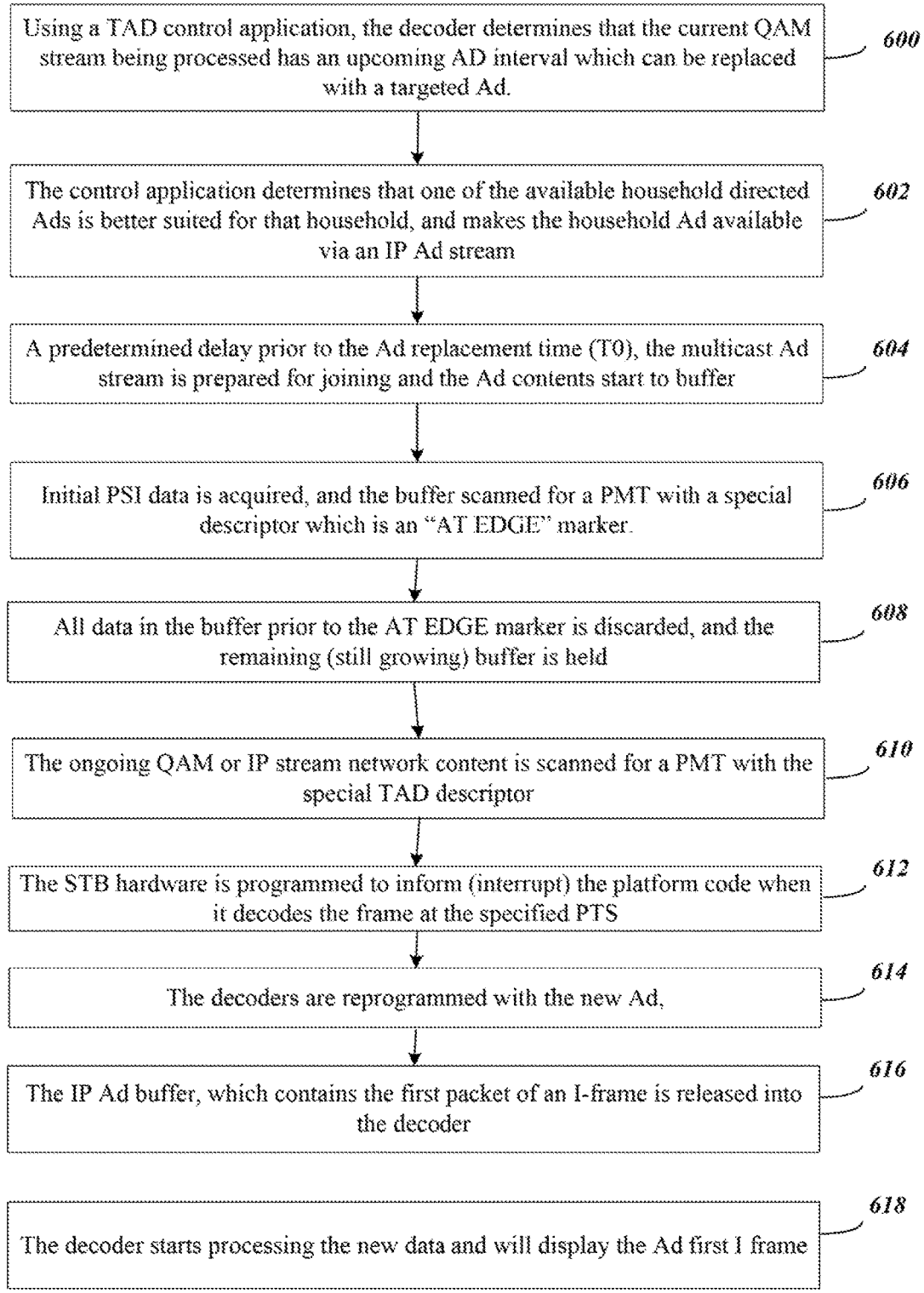
FIG. 6 is a flowchart providing a detailed example of an embodiment of the present invention with a QAM network stream having an IP inserted Ad.

FIG. 6 is a flowchart providing a detailed example of an embodiment of the present invention with a QAM network stream having an IP inserted Ad. Due to the timing uncertainties with IP delivery for this particular example, the IP based Ad must be streamed earlier than actually needed.

In a first step 600, using a TAD control application, the decoder determines that the current QAM stream being processed has an upcoming Ad interval which can be replaced with a targeted Ad. In step 602 the control application for inserting Ads determines that one of the available household directed Ads is better suited for that household, and the source of this household Ad will be made via an IP Ad stream.

Because of the delay required, in step 604, a predetermined delay prior to the Ad replacement time (T0), the multicast Ad stream is prepared for joining and the Ad contents start to buffer. The Ad content can be designed to start with valid A/V content immediately if no delay is required by the system, but this could require some type of metadata for delivery. The Ad content can start with a type of 'leader' content, which allows the system to perform a standard PAT/PMT acquisition. This "leader" starting the Ad content is the content type that will be used for this example.

In step 606, Initial PSI data is acquired, and the buffer scanned for a PMT with the special descriptor. In this embodiment, the TAD descriptor contains a marker "AT EDGE". In step 608, all data in the buffer prior to the AT EDGE marker is discarded, and the remaining (still growing) buffer is held.

In step 610, the ongoing QAM or IP stream network content is searched for a PMT with the special TAD descriptor. In this embodiment, the TAD descriptor contains a marker "APPROACHING EDGE" and a PTS value. This PTS value is the system time of the last displayed frame of network data (the frame prior to the beginning of the default network Ad).

In step 612, the STB hardware is programmed to inform the platform code when it decodes the frame at the specified PTS. At this time, the decoder buffers are flushed and the decoders are stopped with the last frame in the decoder output buffer. Then in step 614, the decoders are reprogrammed with the new Ad A/V PIDs.

In step 616, the IP Ad buffer, which contains the first packet of an I-frame (if the PMT "AT EDGE" is inserted correctly) is released into the decoder. In step 618, the decoder starts processing the new data and depending on the display mode, will either immediately display the first I frame, or will hold it until a synchronization is obtained. In one embodiment, the decoder can be programmed to display a black frame when stopped instead of a frozen I-frame. This is typically the desired mode when transitioning to TAD content. Unlike traditional TAD systems where the content has to be modified to contain a black 'landing zone' for the tune transitions, the A/V content in this example is not modified.

For this example, only the PSI messages of the Ad stream have to be modified, with the worst case change being the insertion of an extra PMT into the stream whenever an "AT EDGE" indication is needed. This grooming of stock streams can easily be done at the headend with fairly simple equipment. For some embodiments of the present invention, the network stream is also modified. The network stream if an IP stream will need a PSI message inserted as well to contain at least an APPROACHING EDGE marker flag for each position where an Ad insertion opportunity exists.

Figure 7:
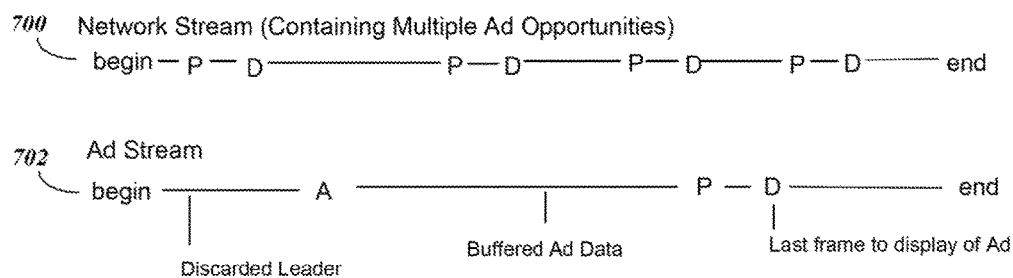
FIG. 7 illustrates a typical network stream with positions in that stream for several different Ad insertion opportunities.

FIG. 7 illustrates a typical network stream with positions in that stream for several different Ad insertion opportunities. The inserted PMTs and the decoder transition points are both shown. The network stream 700 is shown, and the inserted Ad Stream 702 is also shown, with both the AT EDGE entry into that stream and the APPROACHING EDGE marker so that seamless exit from the Ad can likewise take place. Note that using the APPROACHING EDGE marker to exit the Ad allows not only return to the network stream, but a simple and seamless method for inserting one or more additional Ads. The embodiment shown by FIG. 7 illustrates how stream content can be used so that ads can be seamlessly chained together.

The illustration of FIG. 7 includes a network stream 700 and an Ad stream 702, and for the streams as shown, the stream contents are shown as well including the following items P, A, D that are defined as follows: "P" is a special PMT with ApproachingEdge flag and PTS value. "A" is a special PMT with AtEdge flag. "D" is a position in a stream where PTS value on the decoded frame is encountered, and the decoder, if setup properly, will inform the controller that it is at the proper location.

The diagram of FIG. 7 illustrates that the end of the Ad looks just like any of the insertion opportunities in the network stream, so Ads can be seamlessly chained together. Like conventional Targeted Ad systems, the length of the Ads inserted in FIG. 7 are coordinated with the amount of available time in the network stream for these Ads.

The MPEG standard allows the use of private descriptors as an added part of the PMT. Since they vendor specific, or private, they can contains any data the vendor wants, in whatever format they desire. Any other user of the data stream will see this private descriptor and will not know what it is, or know its purpose, and should ignore it. This is the basis of being MPEG compliant with regard to private descriptors. Accordingly, modifying the stream according to embodiments as described herein, i.e. taking the existing service PMT, adding the descriptor, and inserting it back into the stream at specific locations provides a fully MPEG compliant stream with no impact to any other CPE or software streaming device.

Embodiments of the present invention use a headend device for distributing and modifying the Ad and video content streams. The headend device includes at least one processor and a memory for storing code that is executable by the processor to enable the processor to modify the IP Ad stream and video content stream according to embodiments of the present invention. Likewise, embodiments of the present invention include a home Consumer Premises Equipment (CPE) such as a STB or a DVR that includes a decoder. The CPE device includes at least one processor and a memory for storing code that is executable by the processor to enable the processor to process Ad streams and video content streams to synchronize the streams and recognize modified content of the streams and process the content according to embodiments of the present invention.

Although the present invention has been described above with particularity, this was merely to teach one of ordinary skill in the art how to make and use the invention. Many additional modifications will fall within the scope of the invention as that scope is defined by the following claims.

What is claimed:

1. A method for delivering targeted advertisements comprising:

determining by a TAD control application that a QAM, unicast or IP multicast stream has an upcoming ad interval into which a targeted ad can be placed;

determining available ads that are suited for the household receiving the QAM stream;

selecting one of the available ads to provide an ad stream;

providing the ad stream in an ad buffer a predetermined time before joining the ad stream to the IP multicast stream, wherein the ad stream content begins with a leader which allows the system to perform a PMT acquisition;

processing the ad stream to extract PSI data and scan for a PMT with a special descriptor comprising an AT EDGE marker;

discarding all data in the ad buffer prior to the AT EDGE marker;

scanning the QAM IP multicast network content stream for a PMT with a special TAD descriptor containing an APPROACHING EDGE marker and a specified PTS value, wherein the specified PTS value is the system time of the last displayed frame of the QAM IP network content stream; and providing an indication when a frame with the specified PTS is decoded, and when the identification is provided flushing the decoder and internal decoder buffer with the QAM IP multicast stream and reprogramming a decoder to receive the next inserted Ad stream;

releasing onto the PID channels the IP buffer contents of the ad stream beginning with the first packet of an I-frame identified by the PMT AT EDGE marker; and processing the ad stream in the decoder.

2. The method of claim 1, further comprising displaying a black frame instead of a frozen I-frame when the decoder is stopped to transition to TAD content containing the TAD descriptor at a PTS position as indicated by the decoder.

\* \* \* \* \*